United States Patent [19]

Fischer et al.

[11] Patent Number: 4,579,375
[45] Date of Patent: Apr. 1, 1986

[54] SHEET METAL DUCT SYSTEM HAVING INTEGRAL TRANSVERSE FLANGES

[75] Inventors: Herbert J. Fischer, Imperial; John D. Merideth, Pevely, both of Mo.

[73] Assignee: Engel Industries, Inc., St. Louis, Mo.

[21] Appl. No.: 567,748

[22] Filed: Jan. 3, 1984

[51] Int. Cl.[4] ............................................. F16L 23/00
[52] U.S. Cl. .................................... 285/363; 285/424; 285/DIG. 22; 285/406; 285/364; 403/338
[58] Field of Search ............... 285/363, 405, 424, 364, 285/406, DIG. 22; 24/293, 294, 295, 555; 403/338, 335, 393, 405

[56] References Cited

U.S. PATENT DOCUMENTS

| | | | |
|---|---|---|---|
| 3,791,681 | 2/1974 | Moldow | 285/424 |
| 3,923,326 | 12/1975 | Mez | 285/363 |
| 4,218,079 | 8/1980 | Arnoldt | 285/363 |
| 4,252,350 | 2/1981 | Smitka | 285/363 |
| 4,351,390 | 9/1982 | Argyle et al. | 285/364 |
| 4,447,079 | 5/1984 | Sullivan | 285/363 |
| 4,466,641 | 8/1984 | Heilmann et al. | 285/424 |

FOREIGN PATENT DOCUMENTS

| | | | |
|---|---|---|---|
| 2353624 | 5/1975 | Fed. Rep. of Germany | 285/424 |
| 2434160 | 1/1976 | Fed. Rep. of Germany | 285/424 |
| 3214693 | 2/1983 | Fed. Rep. of Germany | 403/405 |
| 0594161 | 12/1977 | Switzerland | 285/406 |

Primary Examiner—Cornelius J. Husar
Assistant Examiner—Eric K. Nicholson
Attorney, Agent, or Firm—Jerome A. Gross

[57] ABSTRACT

Integral transverse flanges on duct sections made up, for example, of two L-shaped work pieces, are readily assembled into permanent rigid section-joining frames. At the frame corners, the interfitted flanged ends of corner pieces are trapped, adjacent to the integral flange webs, behind an outward-turned ridge on a surface of the duct and beneath an inward and backward turned spring margin having a progression of lanced projections. Tabs, extending across the lines of juncture of the L-shaped pieces along the outward turned ridge, are peened over to seal the joints of the work pieces positively and prevent the escape of air. Easily applied clips hold the flanges of the adjacent duct sections tightly against each other, and may be used also to retain narrow reinforcing bars likewise behind the out turned ridge and beneath the spring margins.

5 Claims, 8 Drawing Figures

Sheet metal duct system having integral transverse flanges

SHEET METAL DUCT SYSTEM HAVING INTEGRAL TRANSVERSE FLANGES

TECHNICAL FIELD

This invention relates to sheet metal ducts of rectangular cross-section, such as commonly used in heating and air conditioning installations.

BACKGROUND ART

Rectangular ducts used for conducting air as for heating and air conditioning are conventionally made up of relatively short sections. In the most common construction, two workpieces are used for each section, formed longitudinally to L-shape, and having their longitudinal edges seamed, as with a Pittsburgh lock joint. Transverse frames are provided at the ends of the duct sections, so that abutting duct sections may be bolted together at their corners, with the frames held by clips or drive cleats. If one of the sides of the duct section is relatively long, considering the gage of sheet metal utilized, reinforcing bars may be added within the flanges.

Ordinarily such transverse frames are not integral. To join them to the rectangular sheet duct pieces is fairly complex; and extensive use of sealants may be required to assure against leakage of air.

Some duct systems heretofore used have employed transverse frames which are essentially integral, by bending (ordinarily by rolling) transverse flanges whose webs extend outwardly from the duct surfaces at 90° and terminate in outer flanges bent back 90°. Corner pieces are installed to make these rolled flanges into frames; the corner angles of adjacent frames so formed may then be bolted together, and the flanges which project from the adjacent webs may be held together by clips or drive cleats. Such integral transverse flanges may not hold the corner pieces with rigidity and security adequate for the loads likely to be imposed. There is also the problem of leakage of air through the seams immediately adjacent to the integral flanges, because of the inconsistency between longitudinal roll-forming and transverse roll-forming. A typical sheet metal seam, such as a Pittsburgh lock, cannot feasibly be formed immediately adjacent to a transverse bend.

One construction utilizing integral transverse flanges, produced and marketed by Iowa Precision Industries, Inc., adds some rigidity by grooving the sheet metal duct sides inward adjacent to the outwardly-formed webs; however, such inward grooves cut down the duct area through which air may flow. That construction also uses projections on the corner piece ends to hold the ends of flat reinforcing bars, whose inner edges are seated in such grooves and whose outer edges are fitted beneath the 90° bent outer flanges.

SUMMARY OF THE INVENTION

The purposes of the invention are to provide an improved system of duct sections joined at the duct section ends by accurately formed integral transverse flanges, without any internal restriction to air flow; to utilize such integral flanges for easy snap-in and firm securement of corner angles, as well as supplemental reinforcing bars where required; to make integral provisions for sealing the joined longitudinal seams of the duct sections at their intersections with the transverse joints; and the other purposes as will be apparent from the following disclosure.

In the present invention, before bending the flat ductwork pieces and joining their longitudinal seams to form duct sections, and as one of the initial steps of rollforming the transverse flanges, we rollform a transverse tracking ridge; this serves to align and guide the workpiece during the subsequent stages of rollforming, assuring accuracy of the flange portions outward of the ridge. Being formed to project on the outer side of the duct sections, the transverse tracking ridges will not obstruct the airflow through the duct, as do the inward grooves of the prior art construction of Iowa Precision Industries, above referred to.

The integral transverse flanges are formed at a spacing from the tracking ridges sufficient to accommodate the legs of stamped steel corner angles. Each such integral flange has an outstanding web portion which terminates in a 90° bent flange ending in an edge turned under and rounded back more than 180°, terminating in an interior spring margin. The present spring margin serves to hold, between it and the duct surface portion delineated by the web and the tracking ridge, the leg of a steel corner angle, as well as an optional flat reinforcing bar, which may be used between the corner angles. "Button lock" lances through the rounded-back edge so project aft as to latch the legs of the corners and the reinforcing bars securely beneath the turned-under spring margins.

A disadvantage of integral transverse-flanged duct sections heretofore has been this: at the longitudinal corners at which the duct section workpieces are joined in a Pittsburgh lock or other seam, such seam must stop spacedly short of the transverse flange. This would leave an opening between the end of the Pittsburgh lock and the transverse flange, through which air might escape.

To overcome this problem of escape of air, without using putty-like sealants, a projecting tab is here provided in the flat pattern of the sheet metal workpieces, at the location of the tracking ridge to be formed, along preferably that workpiece edge which is first bent, by longitudinal rolling, to form the male part of the Pittsburgh lock. Thereafter, when the tracking ridge is rolled transversely, the tab is restored to alignment with the tracking ridge; it then has the profile of, and is in fact, a continuation of the tracking ridge extending beyond the corner to be joined. After the Pittsburgh seam is joined, the tab is peened over at 90°, providing a tight metal-to-metal seal over the opening which would otherwise be left. The transverse rolling restores, to the desired flange shape, that portion of the transverse margin along the opposite sheet edge which, on longitudinal rolling, was bent to form a portion of the Pittsburgh pocket.

To hold adjacent duct sections together, strip gasketing is applied between the integral flanges, the adjacent sections are bolted to each by their four corner angles, and clips are applied over the outstanding flange edges. Clips of special design are provided, to afford greater ease of application than clips or drive cleats heretofore used, and also to secure reinforcing bars if they are to be used.

The clip of the present invention has two parallel bends, each between 90° and 180°, which ultimately grasp the opposite positioned round edge flange portions to hold them closely together (hereinafter called the "securing bends"). In addition it has a third parallel bend (herein called the "preliminary nesting ridge") which is alongside the second securing bend and spaced somewhat farther from the first securing bend. To apply the clip, the preliminary ridge is positioned over the rounded edge of one of the opposed flanges, and the clip is rotated about it so that the first securing bend (which is remote from the nesting ridge) passes into position over and engages the rounded bend of the other flange. Then, after pressing this first securing bend of the clip against the rounded bend so engaged, the clip is rotated thereabout, springing it slightly as the rounded second securing bend passes to engage the rounded edge of the outer flange.

Where reinforcing bars are to be added between the corner angles, the clips are provided with a leg portion adjacent to the nesting bend. As the rotation about the first securing bend causes the second securing bend to be engaged, this leg portion is brought to bear against the side surface of the reinforcing bar. Such bearing support is itself not new.

THE DRAWINGS

FIG. 1 is a fragmentary perspective view, partly schematic, showing the juncture of two adjacent duct sections embodying the present invention.

FIG. 2 is a fragmentary view in flat pattern of the corner portions of two duct workpieces. The vertical lines represent edges to be joined at a longitudinal seam and bend lines inward thereof. The horizontal lines represent the transverse flanges and their bends to be formed, as well as tracking ridges inward thereof.

BEST MODE FOR CARRYING OUT THE INVENTION

Figure 1:
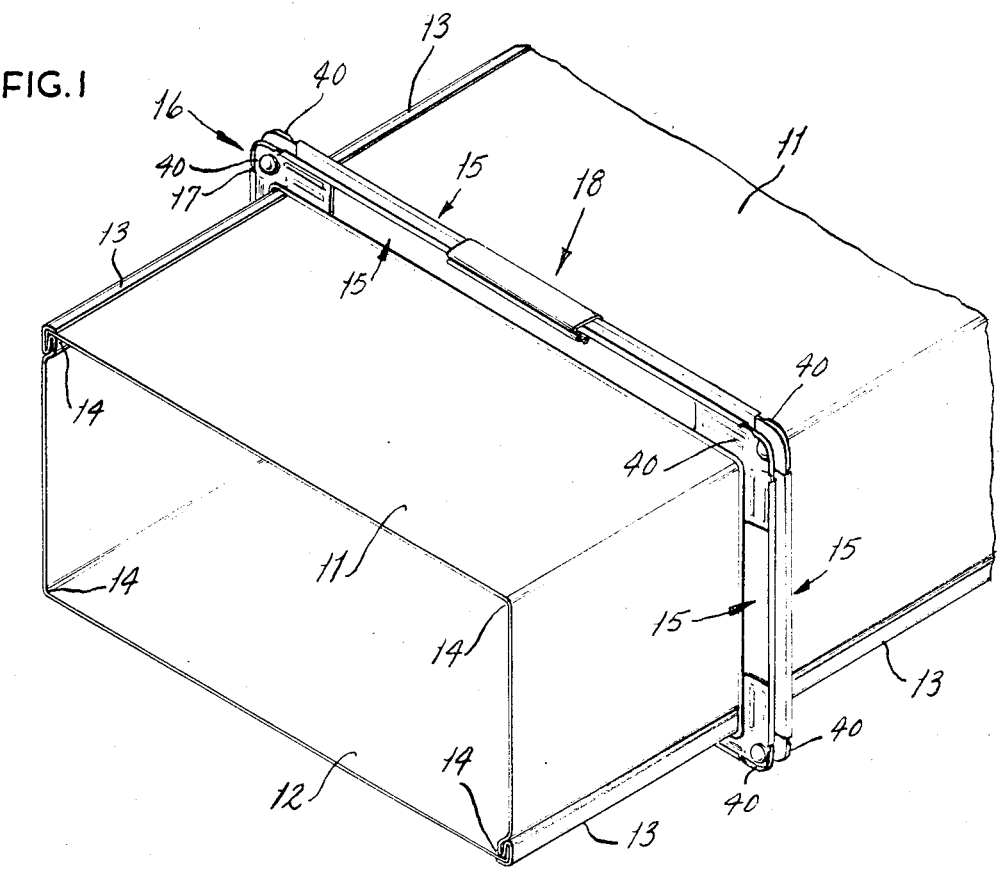

Referring to FIG. 1, a first L-shaped duct workpiece 11 is shown joined to a second L-shaped duct workpiece 12 along longitudinal seams 13, here shown to be conventional Pittsburgh locks. The duct sections so joined thus have four longitudinal rectilinear edges 14. At the ends of the duct sections so formed are integral, outwardly-formed transverse flanges generally designated 15, into the corners of which, best seen in FIGS. 4 and 5, rectangular corner pieces generally designated 16 are mounted. The end of each duct section so formed, consisting of the flanges 15 and corner pieces 16, is mounted adjacent to the end of a similar duct section, to which it is bolted by bolts 17, whose compression is resisted by interposed rubber-like gasket strips 19, seen in FIGS. 6, 7 and 8. Further security is afforded by clipping the adjacent flanges together with clips generally designated 18.

Figure 2:
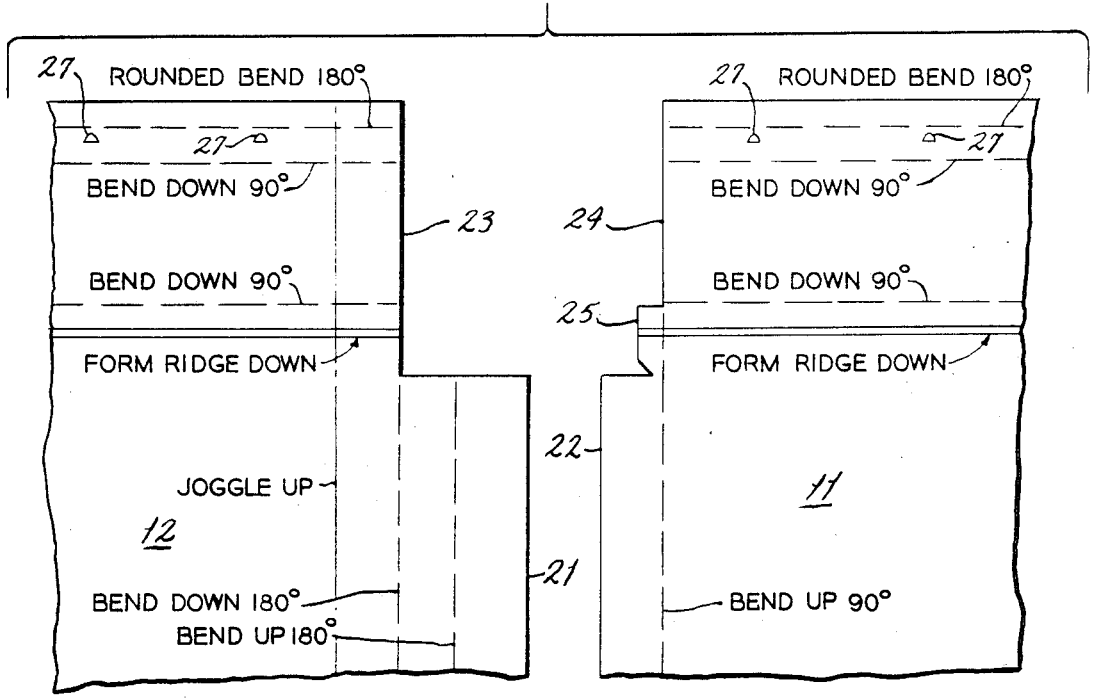

Referring to FIG. 2, the longitudinal edge 21 of duct workpiece 12, shown at the left, is provided with a female Pittsburgh pocket in the usual manner, by joggling up along the line so marked, bending down and back at 180° and bending up and back at 180°; while the mating edge of the duct workpiece 11 is bent 90° to provide a drop edge or male flange 22. Such longitudinal edges 21, 22 are present on each workpiece. To so form the edges 21, 22 is seemingly inconsistent with forming transverse flanges; thus it is seen that the longitudinal "joggle up" line of the left workpiece and the "bend-up 90°" line along the right workpiece cross over the transverse lines of the angular bends and tracking ridge shown in FIG. 2.

In making the present construction, these longitudinal bends are made before rolling along the transverse lines. These transverse lines include a tracking ridge 32, shown to be formed downwardly across both of the workpieces 11, 12, a 90° down-bent line spaced close to the tracking ridge bend, another 90° down-bent line spaced sufficiently from the first to form the desired depth of a web, and a rounded, downward bend of 180° or slightly greater shown close to the upper edge of the workpieces 11, 12. Before this bend is rolled, a plurality of spaced, lanced "button lock" projections 27, hereafter described, are formed spacedly along it.

The forming rolls required for such transverse forming need clearance; accordingly, the longitudinal edge 21 and mating edge 22 stop substantially short of the transverse margin portions 23, 24 of the workpieces 12, 11 respectively. This would permit a gap between the end of the Pittsburgh seam and the transverse flange. However, in the present construction, a tab 25 is provided jutting sidewardly from the edge of the transverse margin portion 24, across the line marked "bend up 90°," but stopping short of the mating longitudinal edge 22. Rolling in accordance with FIG. 2 would also "joggle up" across the marginal portions, shown above, which are to constitute the web and outer flange of the integral flanges. However, when the transverse rolling takes place, the joggle acrosss the transverse margin is rolled back away to original flat configuration and the tab 25 is restored to alignment with that portion of the workpiece 11 shown to the right of it, so that the tab is now perpendicular to the bent-up mating edge 22, as seen in FIG. 3.

Figure 3:
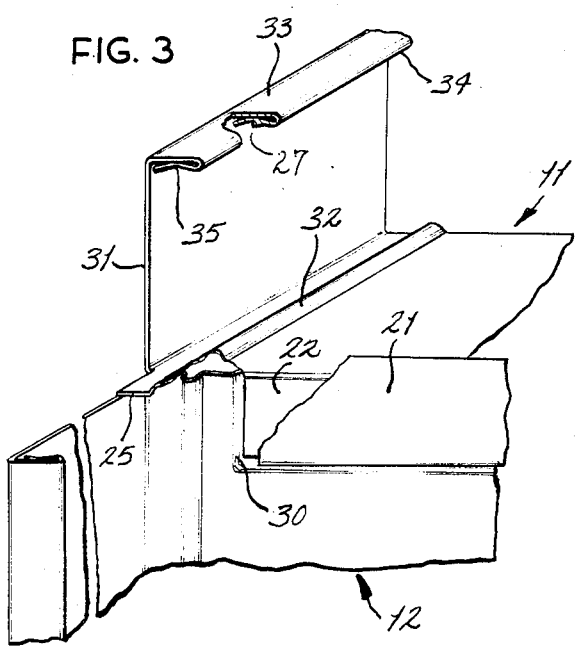
FIG. 3 is a fragmentary schematic view showing the members of FIG. 2 formed and in place for joining.
Figure 4:
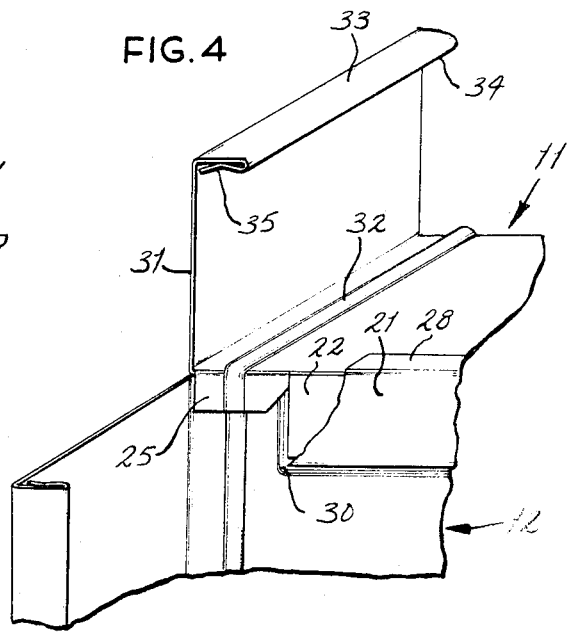
FIG. 4 is a view similar to FIG. 3 showing the workpieces joined by peening over.

FIG. 3 thus shows the configuration of the duct workpieces after being formed along the lines shown in FIG. 2, in position for assembly; and FIG. 4 shows them assembled by peening. The longitudinal "joggle up," "bend down 180°" and "bend up 180°" create the Pittsburgh pocket 30, which, in the completed workpiece, stops short of the transversely flanged workpieces; into the pocket 30 fits the male or drop edge flange 22 of the workpiece 11. The longitudinal edge 21 is wider than the depth of the pocket 30; a narrow marginal portion remaining along the edge 21, projecting in FIG. 3, is shown as the peened over margin 28 in FIG. 4. Also, the tab 25, shown projecting in FIG. 3 with an open space 26 at the tracking ridge juncture, is peened over sealedly to close this space as shown in FIG. 4.

The portions created by the transverse rolling will now be described. Each of the workpieces 11, 12 now has a web 31 extending at 90° from the original surface of the workpiece, with an outward-formed tracking ridge 32 spacedly inward thereof and formed outwardly of the surface of the assembled workpieces. At the outer extremity of the web 31 is an outer flange 33 having a turned-under rounded edge 34, formed at an angle slightly in excess of 180° and terminating in a spring margin 35 which extends back toward the web 31 and normally stands inwardly away from the outer flange 33. The spacing between the web and the tracking ridge 32, which corresponds to the spacing from the web 31 of the somewhat bulbous rounded portion of the turned-under edge 34, is fixed to accommodate the inner and outer flanges of an angular metal corner piece generally designated 40 shown in FIG. 5, hereafter described. The depth between the spring margin 35 and the outer surface of the workpiece between the ridge 32 and the web 31, is such that the leg portions 41 of a corner piece generally designated 40 will snap into position and be held, by the spring margins 35 and the lanced projections 27, securely in place, trapped by the tracking ridge 32.

Figure 5:
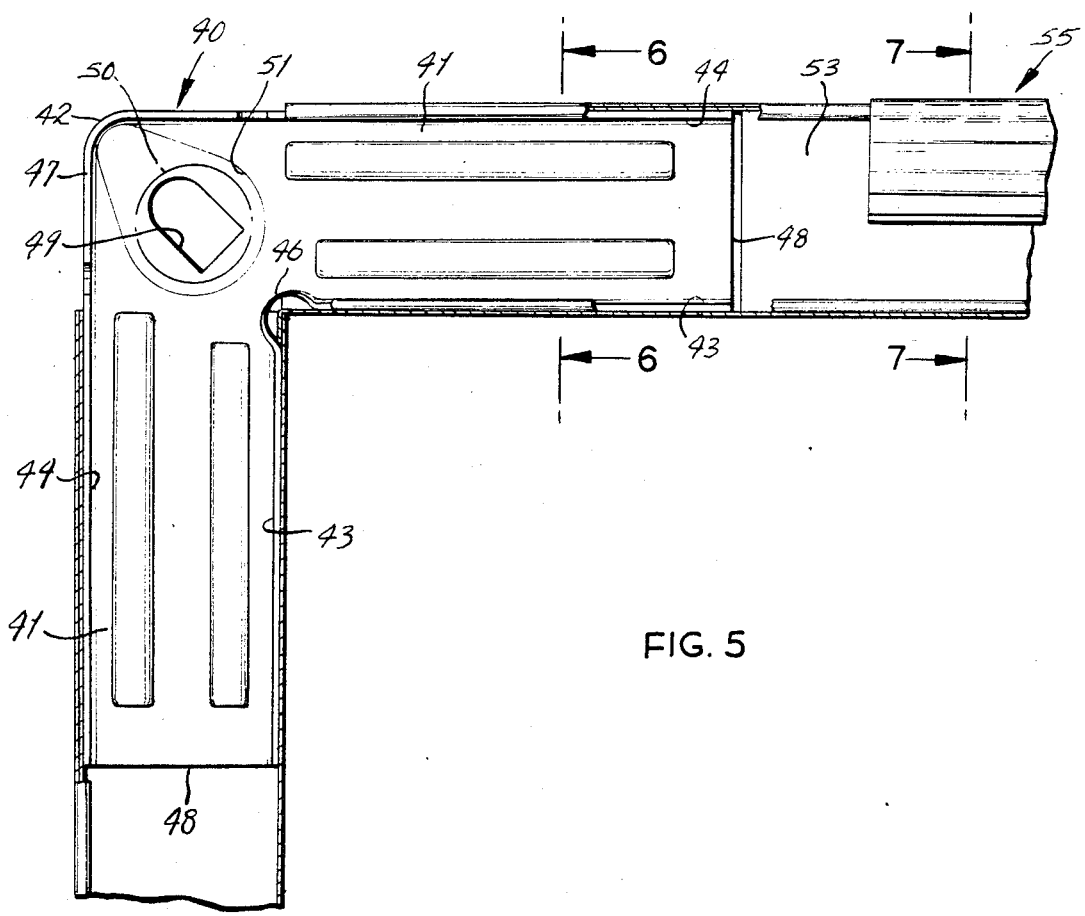
FIG. 5 is an enlarged view of one of the completed corner portions of FIG. 1.

FIG. 5 shows a corner piece 40 in detail. It comprises two leg portions 41, extending at 90° from a corner portion 42 to leg ends 48. The corner piece 40 is formed by stamping sheet metal to provide integral inner flanges 43 and outer flanges 44, of such height as to fit in the manner shown in FIG. 6; that is, the inner flanges 43 fit between the outwardly formed ridge 32 and the web 31, whereas its outer flanges 44 fit beneath the spring margin 35 of each workpiece 11 and 12 and between the web 31 and the lanced projections 27 which face inwardly on the underside of the rounded edge 34. At the corner portion 42 are deeper, bent-around inner and outer flanges 46, 47. Substantially at mid-point of the corner portion 46 a somewhat elongated bore 49 is provided, to receive a bolt 17, as seen in FIG. 1.

The portion of the cornerpiece 40 about the bore 49 preferably has a portion demarked 51 embossed slightly rearward of the plane shown in FIG. 5.

Figure 6:
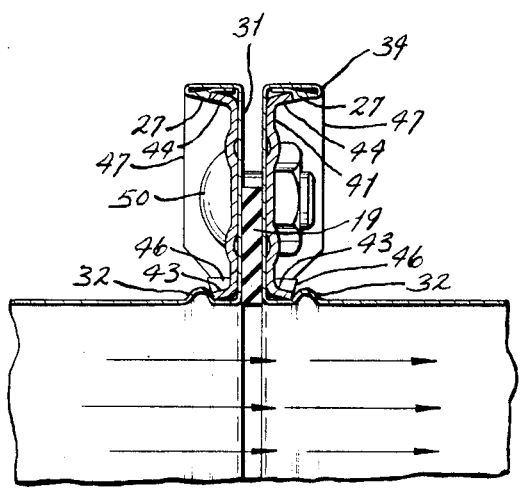
FIG. 6 is a sectional view taken along line 6—6 of FIG. 5, with an adjacent similar duct section joined thereto, as in FIG. 1, the arrows showing unimpeded air flow through their juncture.

With the four corners 40 so engaging the integral flanges described, they form with the flanges what is in effect a transverse frame at each end of a duct section; the bolts 50 serve as the principal structural connections to hold these frames snugly to those of adjacent duct sections and sealed thereto by the gasket strips 19, thus to provide a continuous duct as shown in FIG. 6. Utilization of the outwardly-formed ridges 32 brings about the unique result illustrated in FIGS. 6 and 7, that though the duct sections are reinforced by these transverse ridges 37, they interpose no obstacle to the flow of air through the duct sections, as shown by the arrows. Thus the full cross-sectional area of the duct is available for conducting air.

Figure 7:
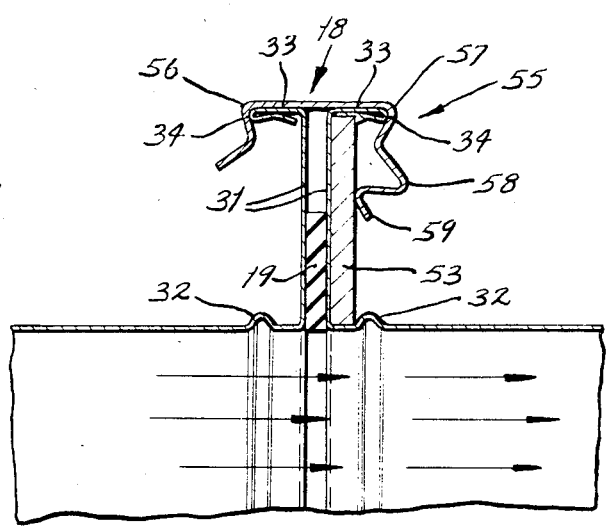
FIG. 7 is a sectional view taken along line 7—7 of FIG. 5 with the clip in final mounted position.
Figure 8:
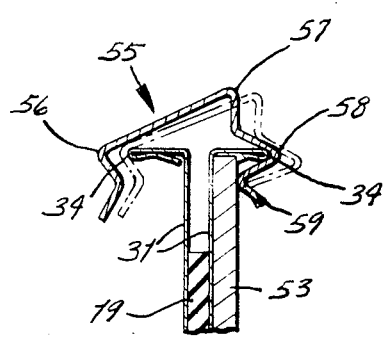
FIG. 8 is a schematic view showing how the clip of FIG. 7 is mounted.

Optional reinforcing bar members 53, shown in FIGS. 5-8 but not in FIG. 1, may be utilized between the leg ends 48 of adjacent corner pieces 40. Such a bar is conventionally used on one side of the abutted flanges where the flange to be supported is long relative to the gage of the sheet metal. If used, it may be snapped in position behind the outwardly-formed ridge 32 and the rounded edge 34 of the outer flange 27, and retained by the lanced projections 27, as shown in FIG. 7, in the same manner as the corner leg portions 41 are retained.

To secure the middle portion integral flanges of adjacent duct sections together, elongated clips or drive cleats are known to be useful. For this purpose, in order to avoid driving, I provide in the present invention a spring clip generally designated 55, preferably formed of elongated rectangular sheet metal to the cross-section configuration shown in FIG. 7. In this configuration, there is a conventional first securing bend 56 and second securing bend 57, to embrace and hold the rounded edges 34 of the opposite flanges of adjacent duct sections. The present clip has, spaced alongside the second securing bend 57 and farther from the first securing bend 56, a preliminary nesting bend 58. This is utilized to facilitate application of the clip without driving, in the manner shown in FIG. 8. The preliminary nesting bend 58 is first engaged onto one of the rounded flanged edges 34, leaving a space at the opposite side, as shown in solid lines in FIG. 8. Thereafter the clip is rotated so that the first securing bend 56 may engage the rounded edge 34 on the opposite side and be pressed close thereto, as shown in the phantom lines in FIG. 8. This opens the space at the opposite side, and permits the clip to be rotated in the final position shown in FIG. 7, against the spring force provided by the portion between the nesting bend 58 in the second securing bend 57.

Preferably the spring clip 55 is equiped, outward of the preliminary nesting bend 58, with a projecting leg portion 59. If a reinforcing member, such as the reinforcing bar member 53, is utilized on one side of this joint, the clip 55 is mounted so that the leg portion 59 will bear against the outer side surface of the reinforcing bar member 53; if no such reinforcing bar member is used, the leg portion 59 serves no function.

From the foregoing it will be seen that an integral transverse flange construction of unusual utility, strength and convenience is provided. Use of the tab 25, peened over as shown in FIG. 4, avoids the air gap which would ordinarily be expected between the end of the longitudinal Pittsburgh seam and the transverse flanges. The tracking ridges 32, projecting outward so as not to interfere with the stream of airflow through the duct as shown in FIG. 7, not only add stiffness at the transverse flanges, but retain the inner flanges 42 of the corner pieces and the inner edges of reinforcing members 53 if used. The spring margins 35, turned inwardly and aft from the rounded edges 34, provide a leaf-spring action which presses against the outer flanges 44 of the corner angles 40 (and the upper edges of the reinforcing bar members 53 if used); while the lanced projections 27 prevent escape of these members despite the imposition of severe loads, as may be imposed on mounting the assembled duct sections.

Further, the tracking ridges 32, formed in the early stages of the transverse rolling, serve to control the alignment of the portions formed by the transverse rolling, assuring precise sizing and fit of the spring margins 35 and the tab portions 25 which, when peened over, avoid air leakage at the ends of the Pittsburgh seams.

From this disclosure, variations in features of construction, will occur to persons skilled in the art.

The embodiments of the invention in which an exclusive property or privilege is claimed are defined as follows:

1. A four-sided sheet metal duct section, each of the four sides being integrally flanged transversely, at each of said duct section ends, outward and back at successive 90° bends, whereby to provide a web and an outer flange, each said outer flange having a turned-under 180° rounded edge from which an inward-presented spring margin extends back toward the web, in combination with 90° angular metal cornerpieces at each corner, said cornerpieces having inner flanges presented against said duct sides adjacent to said webs, said cornerpieces further having outer flanges fitting against and pressed inward by the said spring margins of said integral outer flanges, whereby the said spring margins provide secure mounting of said cornerpieces by snapping in place within the integral flanges, and which said duct section has at least one pair of longitudinal edges joined, at a longitudinal corner, in a seam, and each of the four sides of said ducts has a ridge parallel and adjacent to said web, whereby to retain an inner edge of said cornerpiece, and in which said ridge is formed by outward roll-forming on each of said four sides, whereby on joining said seam, an opening therein is left at said outward roll-formed ridge, and in which one of said longitudinal edges so joined has a tab portion extending therebeyond and aligned with said ridge, whereby on joining said seam, such opening may be sealed by peening said projecting tab portion over such opening.

2. A sheet metal duct section as defined in claim 1, together with a reinforcing member between said cornerpieces in two adjacent corners, said reinforcing member having an elongated flat inner longitudinal edge retained against one of said duct sides adjacent to a web, and having outer longitudinal edges fitted against and retained by said spring margins.

3. A four-sided sheet metal duct section, each of the four sides being integrally flanged transversely, at each of said duct section ends, outward and back at successive 90° bends, whereby to provide a web and an outer flange, said duct section having at least one pair of longitudinal edges joined, at a longitudinal corner, in a seam, each of the four sides of said ducts having a ridge parallel and adjacent to said web, whereby to retain an inner edge of a cornerpiece, said ridge being formed by outward roll-forming of each of said four sides, whereby on joining said seam, an opening therein is left at said outward roll-formed ridge, one of said longitudinal edges so joined having a tab portion extending therebeyond and aligned with said ridge, whereby on joining said seam, such opening may be sealed by peening said projecting tab portion over such opening.

4. Sheet metal duct construction comprising a first duct section and an adjacent duct section having integral transverse outwardly bent parallel webs, and having outer flanges bent back from such webs at 90° bends and terminating at parallel outstanding edges, angular metal cornerpieces at each corner of each duct section, and bolts connecting the cornerpieces of one said duct section to the cornerpieces of said adjacent duct section, together with a securing clip securing transverse outer flanges of said first duct section to those of said adjacent duct section, said securing clip being formed of rectangular springy sheet metal and having two parallel longitudinal securing bends each formed toward the other at an angle greater than 90° and less than 180°, the second of said securing bends being spaced from the first said securing bend at a distance required to embrace, within said securing bends, the said outstanding edges of said outer flanges of said duct sections, said securing clip further having an outwardly formed preliminary nesting ridge parallel to and spaced alongside said second securing bend and farther from said first securing bend than said second securing bend, whereby said spring clip may be applied by presenting said preliminary nesting ridge against the said outstanding edge of the said adjacent duct section flange, then rotating the clip about said outstanding edge as to present its first securing bend near to the outstanding edge of said first duct section flange, then presenting the first securing bend against said outstanding edge of said first duct section flange, and then rotating the clip, against the resistance of its springiness, about the said edge of said first duct section flange as to engage its second securing bend onto the outstanding edge of said adjacent duct section flange.

5. A four-sided sheet metal duct section, each of the four sides being integrally flanged transversely, at each of said duct section ends, outward and back at successive 90° bends, whereby to provide a web and an outer flange, each said outer flange having a turned-under 180° rounded edge from which an inward-presented spring margin extends back toward the web, in combination with 90° angular metal cornerpieces at each corner, said cornerpieces having inner flanges presented against said duct sides adjacent to said webs, said cornerpieces further having outer flanges fitting against and pressed inward by the said spring margins of said integral outer flanges, whereby the said spring margins provide secure mounting of said cornerpieces by snapping in place within the integral flanges, and in which duct section a plurality of lanced projections are provided along that side of the said rounded edges from which said spring margins project, whereby said lanced projections prevent the escape of the corner outer flanges from retention by the said spring margins of said integral outer flanges.

* * * * *